United States Patent [19]

Nagano

[11] Patent Number: 4,700,588
[45] Date of Patent: Oct. 20, 1987

[54] PEDAL FOR A BICYCLE

[75] Inventor: Masashi Nagano, Izumi, Japan

[73] Assignee: Shimano Industrial Company Limited, Osaka, Japan

[21] Appl. No.: 810,903

[22] Filed: Dec. 20, 1985

Related U.S. Application Data

[63] Continuation of Ser. No. 554,704, Nov. 23, 1983, abandoned.

[30] Foreign Application Priority Data

Nov. 29, 1982 [JP] Japan .......................... 57-180810[U]
Dec. 21, 1982 [JP] Japan .......................... 57-194328[U]
Sep. 16, 1983 [JP] Japan ................................ 58-171830

[51] Int. Cl.⁴ ............................................. G05G 1/14
[52] U.S. Cl. ................................................. 74/594.4
[58] Field of Search ................ 74/594.4, 594.5, 594.6, 74/594.7, 560, 563

[56] References Cited

U.S. PATENT DOCUMENTS

| | | | |
|---|---|---|---|
| 5,996,19 | 2/1898 | Matthews | 74/594.6 |
| 1,362,145 | 12/1920 | Saito | 74/594.4 |
| 1,875,399 | 9/1932 | Woller | 74/563 |
| 2,024,499 | 12/1935 | Baron | 74/594.4 |
| 2,069,066 | 1/1937 | Harbour | 74/563 |
| 2,567,785 | 9/1951 | Rieger | 74/594.4 |
| 3,313,177 | 4/1967 | Mueller | 74/594.6 |

FOREIGN PATENT DOCUMENTS 614609 12/1948 United Kingdom .

Primary Examiner—Gary L. Smith
Assistant Examiner—Rodney M. Lindsey
Attorney, Agent, or Firm—Stevens, Davis, Miller & Mosher

[57] ABSTRACT

A bicycle pedal having a pedal shaft and a pedal body, the pedal body being made from synthetic resin and integral with a main body. The main body has bearings and foot bearing members having foot bearing surfaces, so that the foot bearing members are supported such that they are elastically displaceable with respect to the main body to thereby absorb shocks occuring during pedalling.

15 Claims, 19 Drawing Figures

4,700,588

PEDAL FOR A BICYCLE

This application is a continuation of application Ser. No. 554,704, filed Nov. 23, 1983, now abandoned.

FIELD OF THE INVENTION

This invention relates to a pedal for a bicycle, and more particularly, to a bicycle pedal of the type including a pedal shaft and a pedal body rotatably supported thereon.

BACKGROUND ART

Conventionally, a bicycle pedal has a pedal body with a foot bearing surface onto which a cyclist puts his foot for pedalling. In this case, the sole of the foot is brought into press-contact with the foot bearing surface such that the foot is subjected directly to the reaction from pedalling, so that the operator is liable to the discomfort of becoming tired from pedalling.

On the other hand, a pedal has been proposed which provides a foot bearing surface of elastic material, separate from the pedal body, or which has a member having the foot bearing surface, separate from the pedal body, such that the foot bearing surface or the member having the foot bearing surface is supported on the pedal body in an elastically displaceable manner. Such a pedal, however, is disadvantageous in that it requires an increased number of parts, the foot bearing surface and member must be assembled in the pedal body, thus yielding high manufacturing costs, and pedal durability lowers after long use, resulting in detachment of the foot bearing surface or member from the pedal body.

SUMMARY OF THE INVENTION

A primary object of the present invention is to provide a bicycle pedal which has a pedal body molded or synthetic resin and a foot bearing member having a foot bearing surface and, with the foot bearing member being integral with the main body of the pedal body, so that the foot bearing member is made elastically displaceable by means of the elasticity of the synthetic resin of the pedal body, whereby the pedal is simple in construction, has a decreased number of parts, eliminates shock to a cyclist, and provides for comfortable pedalling.

Another object of the invention is to provide a bicycle pedal having a foot bearing member with an elastic foot bearing surface which has a desired elasticity distribution which conforms well to service conditions, the pedal being simple in construction and requiring few parts, thus allowing a cyclist to comfortably pedal the bicycle.

According to the present invention, the pedal body is supported rotatably to the pedal shaft and is molded of synthetic resin. Further, the pedal body comprises a main body having bearings and foot bearing members having foot bearing surfaces so that the foot bearing members are integral with the main body through elastically displaceable portions which are elastically displaceable with respect to the main body.

Accordingly, foot bearing members which are elastically displaced with respect to the main body serve as foot cushions during pedalling, thereby enabling a cyclist to pedal the bicycle without feeling shocks. As a result, the bicycle can be comfortably pedalled and the cyclist becomes less tired even while cycling for a long time.

The elastically displaceable portions which are integral with the main body utilize the elasticity of synthetic resin of the pedal body so that the foot bearing members can be simple in construction and need not be assembled into the main body, in comparison with conventional pedal bodies, whereby there is no fear that the foot bearing members detach from the pedal body.

Furthermore, this invention is characterized also in that the foot bearing members, as discussed below, are devised to be desirably displaceable and further in that an amount of elastic displacement at each position on the foot bearing surface is different from each other.

Firstly, the foot bearing memebers are disposed at the front and rear of the main body and integral therewith through bridges serving as elastically displaceable portions, thereby deflecting the foot bearing members to reasonably conform to the pedalling.

Secondly, the main body comprises a housing having bearings and frame members extending longitudinally of the pedal. The foot bearing members are disposed between the frame members and elastically displaceably connected with either the housing or a frame member through the elastically displaceable portion. The foot bearing surfaces at the foot bearing members project outwardly with respect to the foot bearing surface at the main body.

In such construction, the frame members are formed mainly in a framework so that the main body, after the foot bearing members are deflected, can bear a pedalling force, whereby even for a large load, the pedalling force is transmitted to the pedal body without hindering the transmission efficiency.

The foot bearing members are not particularly defined in arrangement, but a plurality of the same are connected by elastically displaceable portions respectively to vary the amount of elastic displacement of each foot bearing member, thereby enabling the cyclist to comfortably pedal the bicycle due to the suitable displacement of each foot bearing member.

These and other objects of the invention will become more apparent in the detailed description and examples which follow.

BRIEF DESCRIPTION OF THE INVENTION

FIG. 1 is a plan view of an embodiment of a pedal for a bicylce of the invention, FIG. 2 is a partially cutaway plan view of a principal portion of the FIG. 1 embodiment, FIG. 3 is a central longitudinal sectional view of the same, FIGS. 4 through 11 show modified embodiments of the pedal of the invention, FIGS. 4, 6, 8 and 10 are schematic plan views of these modified embodiments, FIG. 5 is a schematic sectional view taken on the line A—A in FIG. 4, FIG. 7 is a schematic sectional view taken on the line B—B in FIG. 6, FIG. 9 is a schematic sectional view taken on the line C—C in FIG. 8, FIG. 11 is a schematic sectional view taken on the line D—D in FIG. 10, FIGS. 12 through 18 show another modified embodiment of the invention, FIG. 12 is a front view of this other modified embodiment, FIG. 13 is a rear view thereof, FIG. 14 is a sectional view taken on the line E—E in FIG. 12, FIG. 15 is an internal view of a first divided member constituting a pedal body, FIG. 16 is a left-hand side view of the first divided body, FIG. 17 is a sectional view taken on the line F—F in FIG. 15, FIG. 18 is a sectional view taken on the line G—G in FIG. 12, showing the first and second divided members prior to connection with each other, and FIG. 19 is a perspective view of still another modified embodiment of the invention.

DETAILED DESCRIPTION OF THE INVENTION

Figure 1:
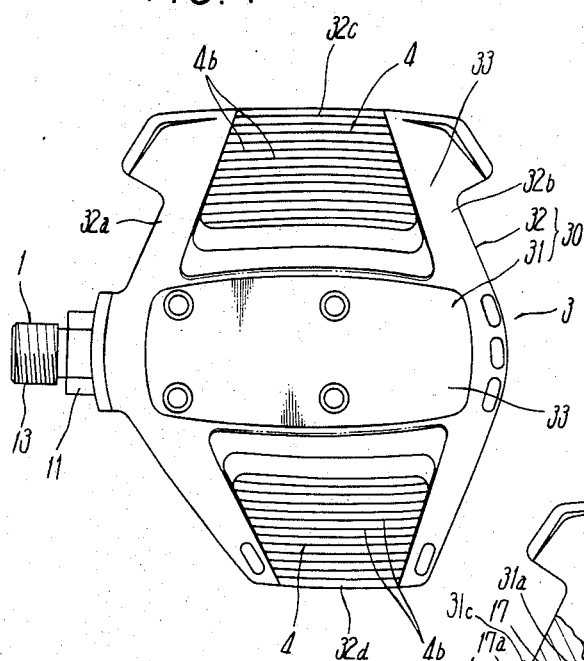

A typical embodiment of a bicycle pedal according to the present invention will be discussed in detail with reference to FIGS. 1 3, in which reference numeral 1 designates a pedal shaft mounted to the free end of a crank arm at a crank means for the bicycle. Pedal shaft 1 comprises mounting shaft portion 11 and support shaft portion 12 extending axially outwardly from one end of mounting shaft portion 11. Mounting shaft portion 11 is provided at its outer periphery with a screw thread 13. Support shaft portion 12 is provided at the outer periphery of its root with a ball race 14 and at the outer periphery of its utmost end with a screw thread 15 which screws with a ball holder 2 having a ball race 21.

Reference numeral 3 designates a pedal body made from synthetic resin. Pedal body 3 comprises the following elements which are integral with each other: main body 30 comprising housing 31 provided with through bore 31a through which support shaft portion 12 is freely inserted; frame member 32 extending frontwardly and rearwardly from housing 31 and formed in a framework as a whole; and foot bearing members 4 discussed in detail below. Housing 31 includes a root end 31b and an utmost end 31c. Sleeve 16 is fitted into through bore 31a, and cups 17 and 18 having ball races 17a and 18a opposite to ball races 14 and 21 are fitted into both open axial ends of sleeve 16 respectively. Between ball races 14 and 17a and between ball races 21 and 18a are interposed balls 19 respectively, so that pedal body 3 is supported rotatably therethrough to the pedal shaft 1.

Frame member 32 comprises first and second frame members 32a and 32b each extending from both lengthwise ends of housing 31 forwardly and backwardly in the direction of forward movement of the bicycle, a third frame member 32c connecting the free front ends of first and second frame members 32a and 32b, and a fourth frame member 32d connecting the free rear ends of first and second frame members 32a and 32b. Frame members 32a through 32d are formed in a framework, so that the upper surfaces of housing 31 and frame members 32a through 32d form the aforesaid foot bearing surfaces 33.

Figure 3:
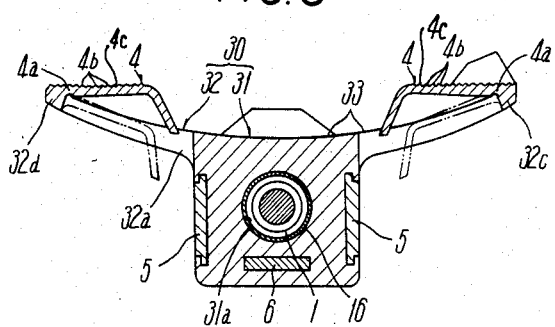

Also, pedal body 3 is molded of, for example, polypropylene resin and sleeve 16, and cups 17 and 18 are used as part of the mold so as to be integral with body 3, with foot bearing surfaces 33, as shown in FIG. 3, being curved as a whole to conform to the sole of a foot of a cyclist from the toes to the plantar arch.

Next, explanation will be given with respect to foot bearing members 4 which are integral with main body 30.

Figure 2:
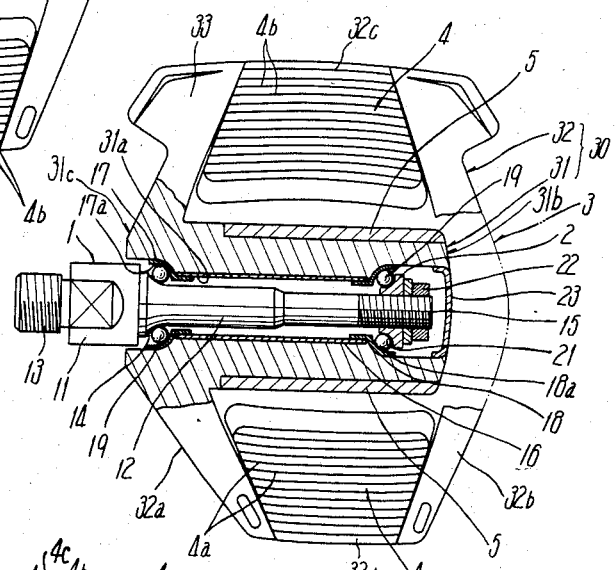

In the embodiment shown in FIGS. 1-3, foot bearing members 4 extend from the third and fourth frame members 32c and 32d toward the housing 31 in relation of being gradually upwardly away from foot bearing surface 33 respectively, and are molded integrally with pedal body 3 to have the foot bearing against upper surfaces respectively. Between foot bearing members 4 and third and fourth frame members 32c and 32d are provided elastically displaceable portions 4a which function as hinge joints respectively, so that the material characteristic of polypropylene resin used in pedal body 3 is utilized to make the foot bearing surfaces displaceable at foot bearing members 4 through the hinge joints as shown by the two-dot-chain line in FIG. 3.

In the same embodiment, foot bearing members 4 each are bent at the free end slantwise downwardly as shown in FIG. 3 to avoid contact with the sole of the cyclist, and are provided on the foot bearing surfaces with a number of anti-slipping serrations 4b. Foot bearing members 4 include foot bearing surfaces 4c as shown in FIG. 3.

In addition, in FIG. 2, reference numeral 22 designates a lock nut and 23 designates a cap, and in FIG. 3, 5 designates reflectors detachably mounted to the front and rear surfaces of housing 31 and 6 designates a balance weight embedded in the lower portion of housing 31 in order to keep foot bearing surface 33 always facing upwardly.

In the pedal of the invention constructed as described above, when a cyclist treads pedal body 3 at his sole from the toes to the plantar arch, its treading force reasonably elastically displaces foot bearing members 4 as shown in FIG. 3 and when the treading force increases to enlarge the displacement of foot bearing members 4, his foot comes into elastic press-contact at the sole with foot bearing surface 33. In other words, the cyclist during pedalling can abut at his sole against foot bearing surface 33 without feeling any shock because foot bearing members 4 serve as a cushion, whereby he can comfortably pedal the bicycle without getting tired even while cycling for a long time.

Alternatively, foot bearing members 4 may be provided as shown in FIGS. 4 through 11.

Figure 4:
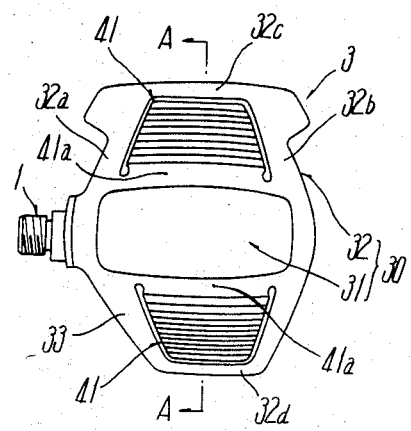
Figure 5:
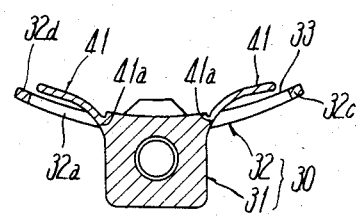
Figure 7:
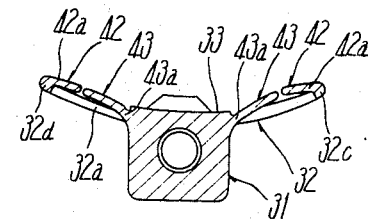
Figure 6:
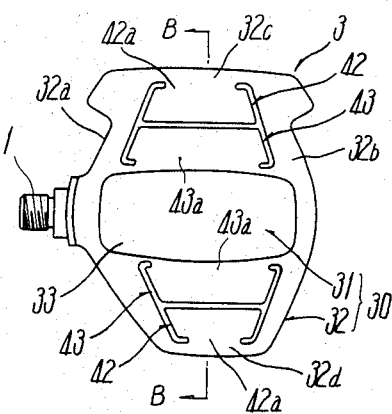

Referring to FIGS. 4 and 5, foot bearing members 41 extend from housing 31 toward third and fourth frame members 32c and 32d through elastically displaceable connections 41a respectively. Referring to FIGS. 6 and 7, foot bearing members 42 extend from third and fourth frame members 32c and 32d halfway toward housing 31 through elastically displaceable connections 42a and foot bearing members 43 extend from housing 31 halfway toward third and fourth frame members 32c and 32d through elastically displaceable connections 43a respectively.

Figure 8:
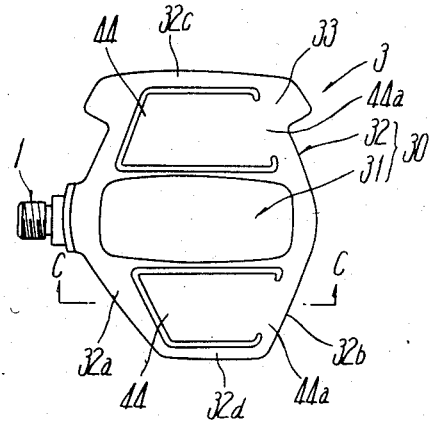
Figure 10:
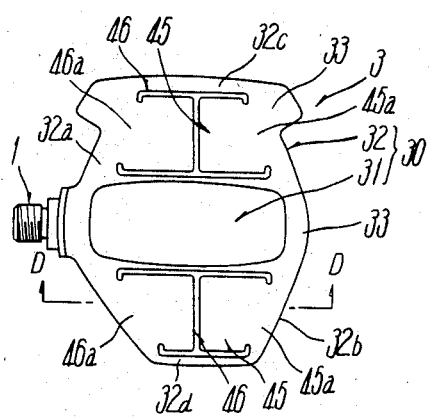
Figure 9:
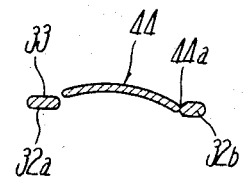
Figure 11:
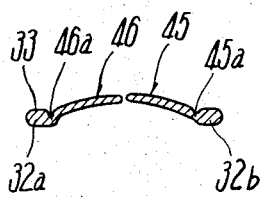
Figure 12:
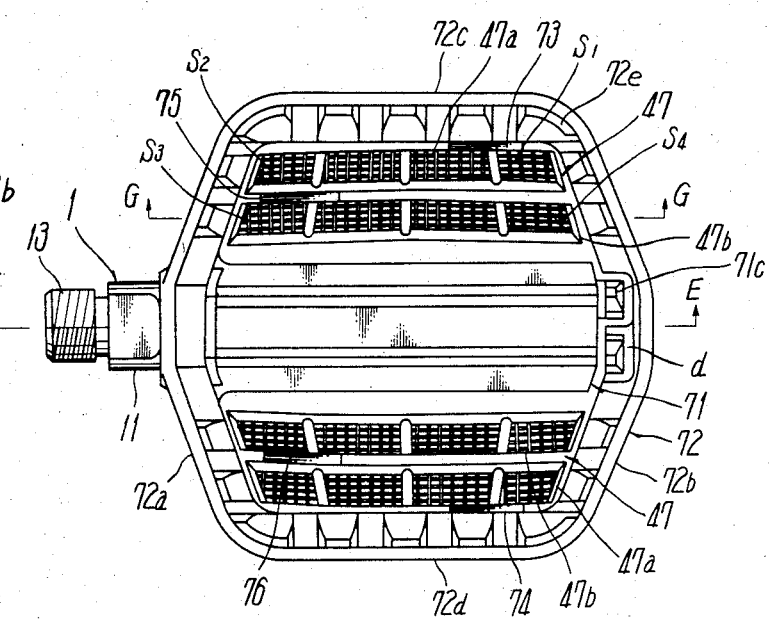
Figure 13:
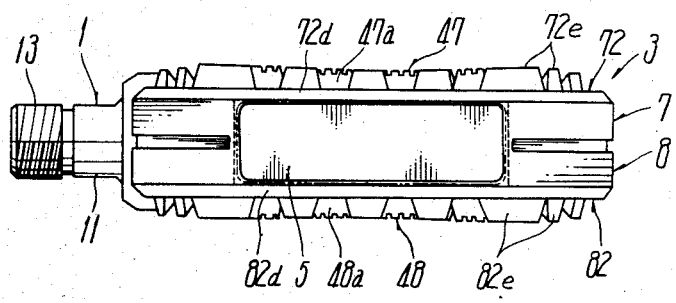

Referring to FIGS. 8 and 9, foot bearing members 44 extend from second frame member 32b toward first frame member 32a through elastically displaceable connections 44a. Referring to FIGS. 10 and 11, foot bearing members 45 extend from second frame member 32b halfway toward first frame member 32a through elastically displaceable connections 45a and foot bearing members 46 extend from first frame member 32a halfway toward second frame member 32b through elastically displaceable connections 46a respectively.

Alternatively, the pedal of the invention may be modified as shown in FIGS. 12 through 18.

This embodiment in the same drawings is basically constructed the same as those shown in FIGS. 1 through 11, but differs therefrom in that pedal body 3 is a two-sided foot-bearing type and in that a plurality of foot bearing members differs from each other in an amount of elastic displacement which occurs at each location. For simplification of the following explanation, components which are the same as those in FIGS. 1 through 11 are designated by the same reference numerals, and explanation thereof is omitted.

The pedal body in this embodiment comprises a pair of first divided body 7 and second divided body 8, which are divided vertically around the pedal shaft 1. First and second divided bodies 7 and 8 comprise main bodies comprising divided housings 71 and 81 and divided frame members 72 and 82, and foot bearing members 47 and 48 which are integral with the main bodies. First and second divided bodies 7 and 8 are molded of synthetic resin and abut against each other to form pedal body 3.

Also, divided bodies 7 and 8 are molded in the same shapes, and connected back-to-back with each other. Weld ribs 70 project from the abutting surfaces of divided bodies 7 and 8 at a plurality of positions thereon, and bodies 7 and 8 are brought into press-contact with each other at opposite surfaces to urge weld ribs 70 at one divided body against the opposite surface of the other. In this condition, both divided bodies 7 and 8 are subjected therebetween to ultrasonic waves to melt weld ribs 70, thereby connecting divided bodies 7 and 8 integrally with each other.

Figure 14:
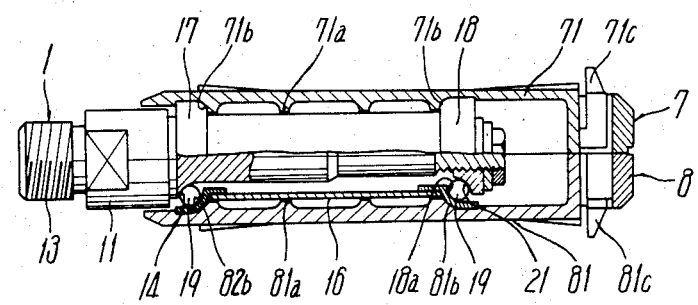
Figure 15:
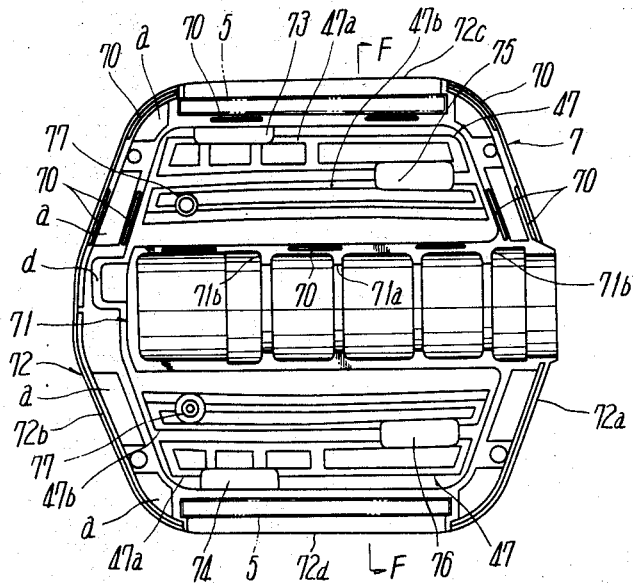
Figure 16:
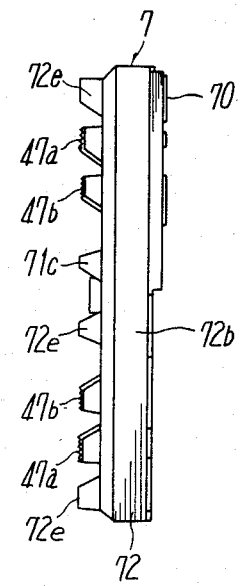

Pedal shaft 1 is incorporated into divided cylindrical housings 71 and 81, which are provided at the inner surfaces with a plurality of ribs 71a and 81a and a pair of shoulders 71b and 81b which retain cups 17 and 18 as shown in FIGS. 14 and 15. Ribs 71a and 81a are brought into contact with the outer surface of sleeve 16 sleeved onto pedal shaft 1, so that cups 17 and 18 and sleeve 16 are fixed to pedal bodies 7 and 8 integral with each other.

Figure 18:
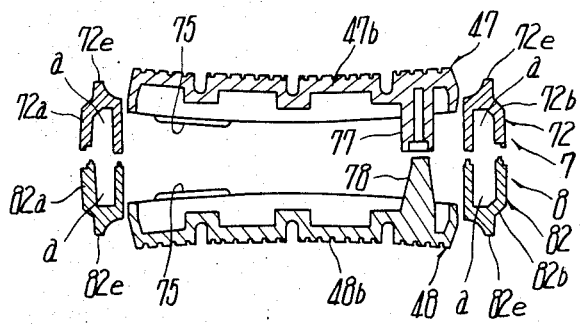
Figure 17:
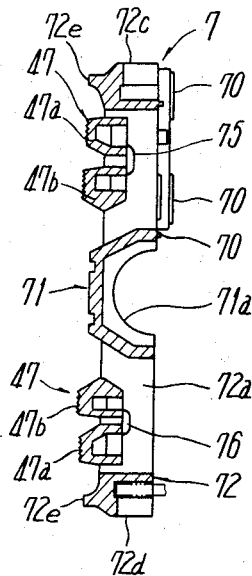

Divided frame members 72 and 82 are formed in a framework comprising first frame members 72a and 82a through fourth frame members 72d and 82d the same as in the first embodiment, with first frame members 72a and 82a being coupled with housings 71 and 81, and second frame members 72b and 82b being apart by predetermined intervals d from housing 71 and 81 respectively as shown in FIGS. 12 to 15. Also, frame members 72 and 82 include cavities a as shown in FIG. 18, thereby reducing distortion, such as a sink mark or a bend, caused during molding, and making pedal bodies 7 and 8 lightweight.

Foot bearing members 47 and 48 are integral with the main bodies, i.e. housings 71 and 81 and frame members 72 and 82, through elastically displaceable portions respectively. In this embodiment, foot bearing member 47 is formed at a first divided body 7 and foot bearing member 48 at a second divided body 8, with foot bearing members 47 and 48 being integral with the third frame members 72c and 82c and fourth frame members 72d and 82d through elastically displaceable connections 73 and 74 respectively.

Also, foot bearing members 47 and 48 at divided bodies 7 and 8 are provided each in a pair at the front and rear of each housing 71 or 81 and opposite vertically to each other at a spaced interval through which foot bearing members 47 and 48 are elastically displaceable. In addition, members 47 and 48 are the same in construction so that explanation will hereinafter be given only on the pairs of foot bearing members 47 at first divided body 7 for simplification of explanation.

Foot bearing members 47, which are coupled with third and fourth frame members 72c and 72d at first divided body 7 through connections 73 and 74 respectively, each comprise first and second foot bearing segments 47a and 47b extending axially of pedal shaft 1 as shown in FIGS. 12 through 15. First foot bearing segments 47a are coupled with third and fourth frame members 72c and 72d through the connectors 73 and 74 (to be hereinafter called the first connectors) positioned axially outwardly of pedal shaft 1, with second foot bearing segments 47b being connected with first foot bearing segments 47a through second elastically displaceable connectors 75 and 76 positioned axially inwardly with respect to pedal shaft 1 and away therefrom. Second foot bearing segments 47b and second foot bearing segments 48b at foot bearing member 48 opposite to second foot bearing segments 47b provide mutually engageable projection 77 and 78 respectively, as shown in FIG. 18.

Now, each foot bearing member 47 constructed as abovementioned can distribute an amount of elastic displacement per unit treading force at the foot bearing surface of the same as follows:

The distribution of elastic displacement becomes a minimum at portion $S_1$ of each foot bearing segment 47a at the first connector 73 or 74 side, increases gradually from portion $S_1$ toward another portion $S_2$ opposite thereto, additionally increases somewhat at portion $S_3$ of each foot bearing segment 47b corresponding to portion $S_2$, and again decreases at portion $S_4$ opposite to portion $S_3$ because engaging projections 77 and 78 engage with each other to allow opposite second foot bearing segments 47b and 48b to exert an influence upon each other. Accordingly, among the foot bearing surfaces of first foot bearing segments 47a and 48a and second ones 47b and 48b, the amount of elastic displacement per unit threading force can be made larger at the portions $S_2$ and $S_3$ at the crank means side.

In the above construction, each foot bearing segment 47 is different in an amount of elastic displacement at the respective portions of the same to thereby be elastically displaceable corresponding to a load given by each toe of the foot of the cyclist between the big toe and the little toe during pedalling. Hence, a shock from pedalling is buffered to enable the cyclist to more comfortably pedal the bicycle.

The embodiment shown in FIGS. 12 through 18, which has gap d between the outside edges of housings 71 and 81 and frame members 72b and 82b and forms pedal bodies 7 and 8 of synthetic resin, can elastically displace frame members 72 and 82 even when subjected to an external force, so that frame members 72 and 82 are capable of serving as shock absorbers to thereby reliably prevent frame members 72 and 82, housings 71 and 81, pedal shaft 1 and crank means, from being broken by such external force.

In addition to the above merit of forming pedal bodies 7 and 8 with synthetic resin, foot bearing members 47 and 48 of synthetic resin can be integral with pedal bodies 7 and 8, thereby reducing the number of parts and simplifying assembly.

In addition, divided frame members 72 and 82 are provided with antislipping projections 72e and 82e respectively and divided housings 71 and 81 with antislipping projections 71c and 81c opposite to the antislipping projection 72e or 82e.

Alternatively, pedal bodies 7 and 8 may be integral with each other.

Figure 19:
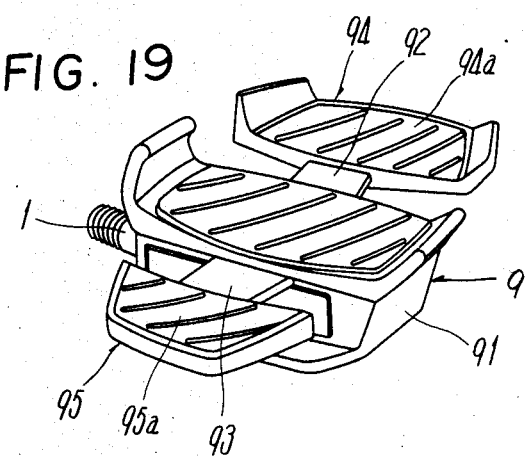

Also, the pedal of the invention may, as shown in FIG. 19, be so constructed that the main body of a pedal body 9 comprises a housing 91 only and a front foot bearing member 94 and a rear foot bearing member 95, which have foot bearing surfaces 94a and 95a respectively and are coupled with housing 91 at the front and rear thereof through bridges 92 and 93 which are made elastically displaceable. In this embodiment, bridges 92 and 93 are elastically displaced to bend and be reasonably fitted to the pedalling so that vibrations and impacts caused by the running of the bicycle are absorbed in part by bridges 92 and 93 and less passed to the foot of the cyclist. Hence, he can more comfortably pedal the bicycle and be less tired even during a long drive.

Although the invention has been described with reference to several embodiments, these embodiments are merely exemplary and not limiting of the invention which is defined solely by the appended claims.

What is claimed is:

1. A pedal for a bicycle, comprising a pedal shaft and a pedal body made from synthetic resin and supported rotatably on said pedal shaft, said pedal body including a rigid main body having bearings including a foot bearing surface, said pedal body including foot bearing members each having a foot bearing surface, said foot bearing members having elastically displaceable portions, said main body comprising a housing having disposed therein said bearings and having a root and an utmost end, and frame members extending forwardly and rearwardly from said housing at said root and said utmost end, said foot bearing members of said pedal body being disposed in a space between said frame members and cantilevered with at least one of said housing and a said frame member to be elastically displaceably coupled therewith through said elastically displaceable portions, said foot bearing surface at each of said foot bearing members projecting outwardly with respect to said foot bearing surface at said main body and being displaceable downwardly by treading pressure of a cyclist's foot to cause said foot bearing surface of said main body to be in position to bear a pedalling force applied by said cyclist's foot, whereby said foot bearing surfaces at said foot bearing members are elastically displaceable with respect to said main body respectively, said elastically displaceable portions being integral with said main body, said foot bearing members and said frame members being in a non-overlapping relation with each other along apedalling direction of said pedal.

2. A pedal for a bicycle according to claim 1, wherein said frame members extend longitudinally with respect to said main body and are formed in a framework comprising a first frame member positioned at a side of said root of said housing, a second frame member positioned at a side of said utmost end of said housing, and third and fourth frame members connecting said first and second frame members at front and rear ends thereof respectively, said foot bearing members being integral with said frame members through elastically displaceable portions respectively.

3. A pedal for a bicycle according to claim 2, wherein said foot bearing members are provided at said third and fourth frame members and extend toward said housing through elastic displaceable portions respectively.

4. A pedal for a bicycle according to claim 2, wherein said foot bearing members are provided at said second frame member and extend toward said first frame member through elastically displaceable portions respectively.

5. A pedal for a bicycle according to claim 2, wherein said first frame member includes foot bearing members extending from said first frame member toward said second frame member and positioned at a side of said root of said housing, and said second frame member includes foot bearing members extending from said second frame member toward said first frame member and positioned at a side of said utmost end of said housing.

6. A pedal for a bicycle according to claim 2, comprising foot bearing members extending from said third and fourth frame members toward said housing and positioned at a side of each of said third and fourth frame members, and foot bearing members extending from said housing toward said third and fourth frame members and positioned at a side of said housing.

7. A pedal for a bicycle according to claim 2, wherein said foot bearing members extend from said housing toward said third and fourth frame members through elastically displaceable portions respectively.

8. A pedal for a bicycle according to claim 1, wherein said foot bearing members are axially elongated with respect to said pedal shaft and foot bearing surfaces of said foot bearing members differ in an amount of elastic displacement at respective portions along an axial direction of said pedal shaft.

9. A pedal for a bicycle according to claim 1, wherein said foot bearing members each comprise first and second foot bearing segments axially elongated with respect to said pedal shaft, said first foot bearing segments being coupled with said main body through first elastically displaceable portions positioned at one length side of said pedal shaft, said second foot bearing segments being coupled with said first foot bearing segments through second elastically displaceable portions positioned axially of said pedal shaft and away therefrom with respect to said first elastically displaceable portions.

10. A pedal for a bicycle according to claim 1, wherein said frame members at said main body are connected in a framework and coupled with said housing at said root side thereof, said housing being spaced at the utmost end thereof from said frame member, so that said frame member is made elastically displaceable with respect to the utmost end of said housing.

11. A pedal for a bicycle according to claim 1, wherein said foot bearing members include elastically displaceable bridges which are coupled integrally with said main body.

12. A pedal for a bicycle according to claim 11, wherein said foot bearing members comprise a front foot bearing member positioned in front of said main body and a rear foot bearing member positioned behind said main body.

13. A pedal for a bicycle according to claim 1, wherein said foot bearing members extend from said housing toward said frame members.

14. A pedal for a bicycle as in claim 1, wherein said elastically displacable portions define hinge joints extending substantially parallel to said pedal shaft.

15. A pedal for a bicycle according to claim 1, wherein said foot bearing surface of said pedal body is elongated in said pedalling direction of said pedal and is curved upwardly on its ends toward the cyclist's foot.

* * * * *